United States Patent [19]

Fornwalt et al.

[11] 4,230,008
[45] Oct. 28, 1980

[54] CABLE SPLITTER

[75] Inventors: Robert G. Fornwalt, Lancaster; Walter C. Shatto, Jr., Harrisburg, both of Pa.

[73] Assignee: AMP Incorporated, Harrisburg, Pa.

[21] Appl. No.: 58,642

[22] Filed: Jul. 19, 1979

[51] Int. Cl.$^3$ .......................... B26D 7/02; H02G 1/12
[52] U.S. Cl. ....................................... 83/456; 83/620; 81/9.51; 225/97
[58] Field of Search ................... 29/749, 564.4, 564.7, 29/566.3; 81/9.5 R, 9.5 A, 9.5 B, 9.5 C, 9.51; 83/613, 618, 620, 382, 456; 140/120; 225/97

[56] References Cited

U.S. PATENT DOCUMENTS

| | | | |
|---|---|---|---|
| 2,915,928 | 12/1959 | Felts et al. ............................. | 81/9.51 |
| 3,002,408 | 10/1961 | Schwalm et al. ...................... | 81/9.51 |
| 3,575,329 | 4/1971 | Hannabery ...................... | 83/925 R X |
| 3,677,732 | 7/1972 | Dornan ............................. | 65/133 |
| 3,706,241 | 12/1972 | Balmer et al. ...................... | 81/9.51 |
| 3,774,478 | 11/1973 | Carpenter et al. ................... | 81/9.51 |
| 3,782,227 | 1/1974 | Veenendaal ......................... | 81/9.51 |
| 3,988,815 | 11/1976 | Petree ................................. | 29/741 X |
| 4,046,045 | 9/1977 | Stevens ............................. | 83/694 X |
| 4,179,964 | 12/1979 | Kirkgasser et al. ............. | 81/9.51 X |

FOREIGN PATENT DOCUMENTS 2158254  6/1973  Fed. Rep. of Germany ............ 81/9.51

*Primary Examiner*—Frank T. Yost
*Assistant Examiner*—Robert P. Olszewski

[57] ABSTRACT

A simplified cable splitter for use with flat multi-conductor ribbon cables is disclosed. The disclosed cable splitter has an opposed jaw system which confines and aligns the cable and the conductors therein. A plurality of finger-like splitting blades are moved into the longitudinal axis of the cable thereby separating selected conductors among the plurality of conductors in the ribbon cable. The result is a ribbon cable having a plurality of conductors in a separated condition available for a termination in an insulation displacement contact.

4 Claims, 10 Drawing Figures

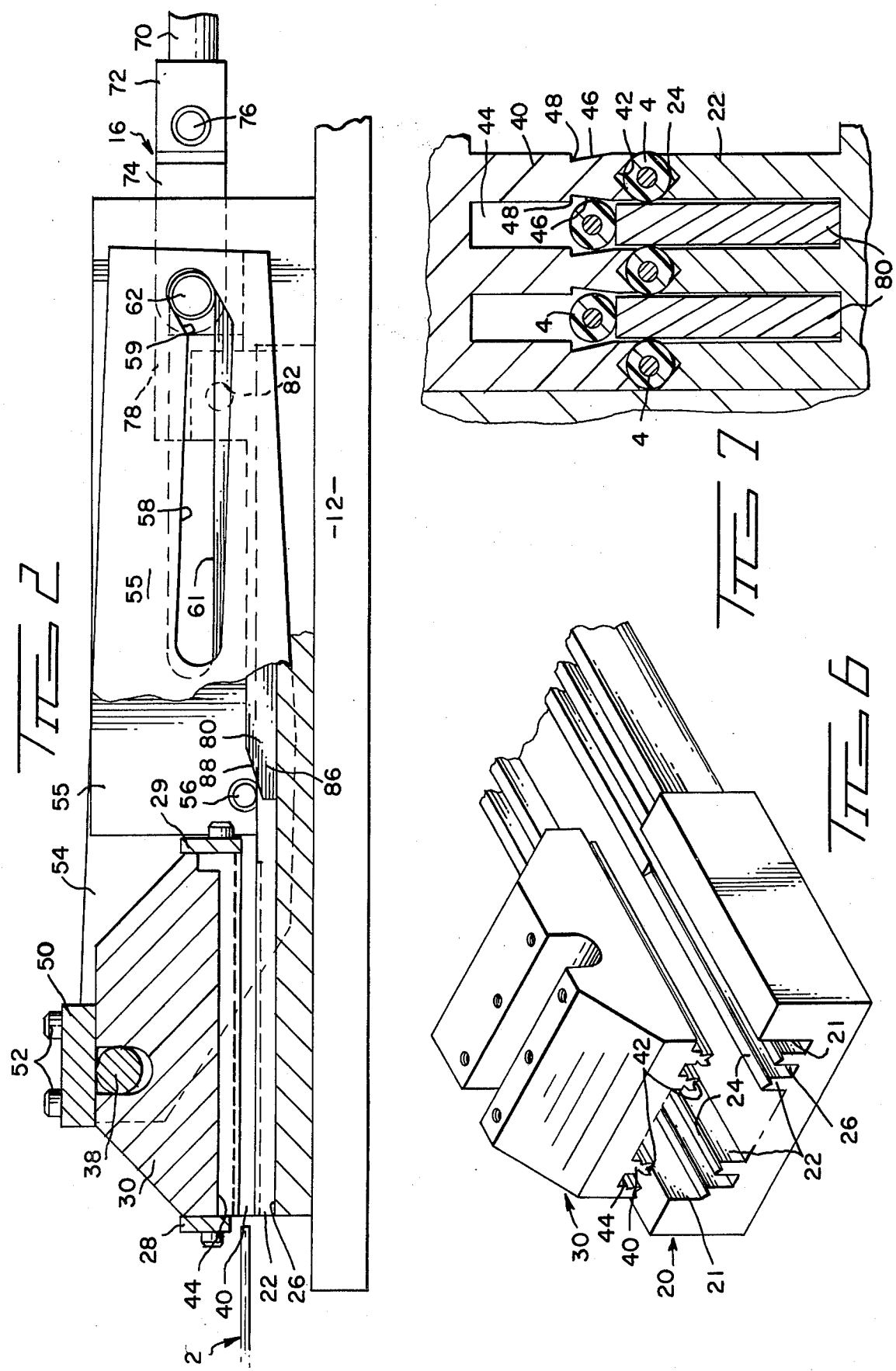

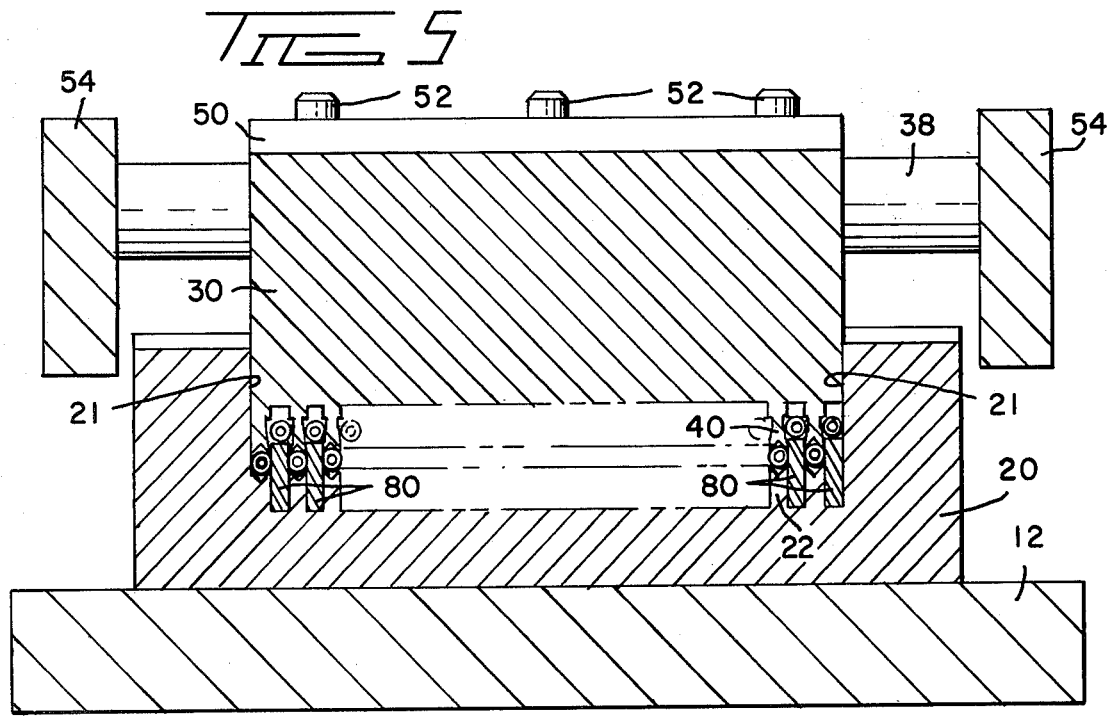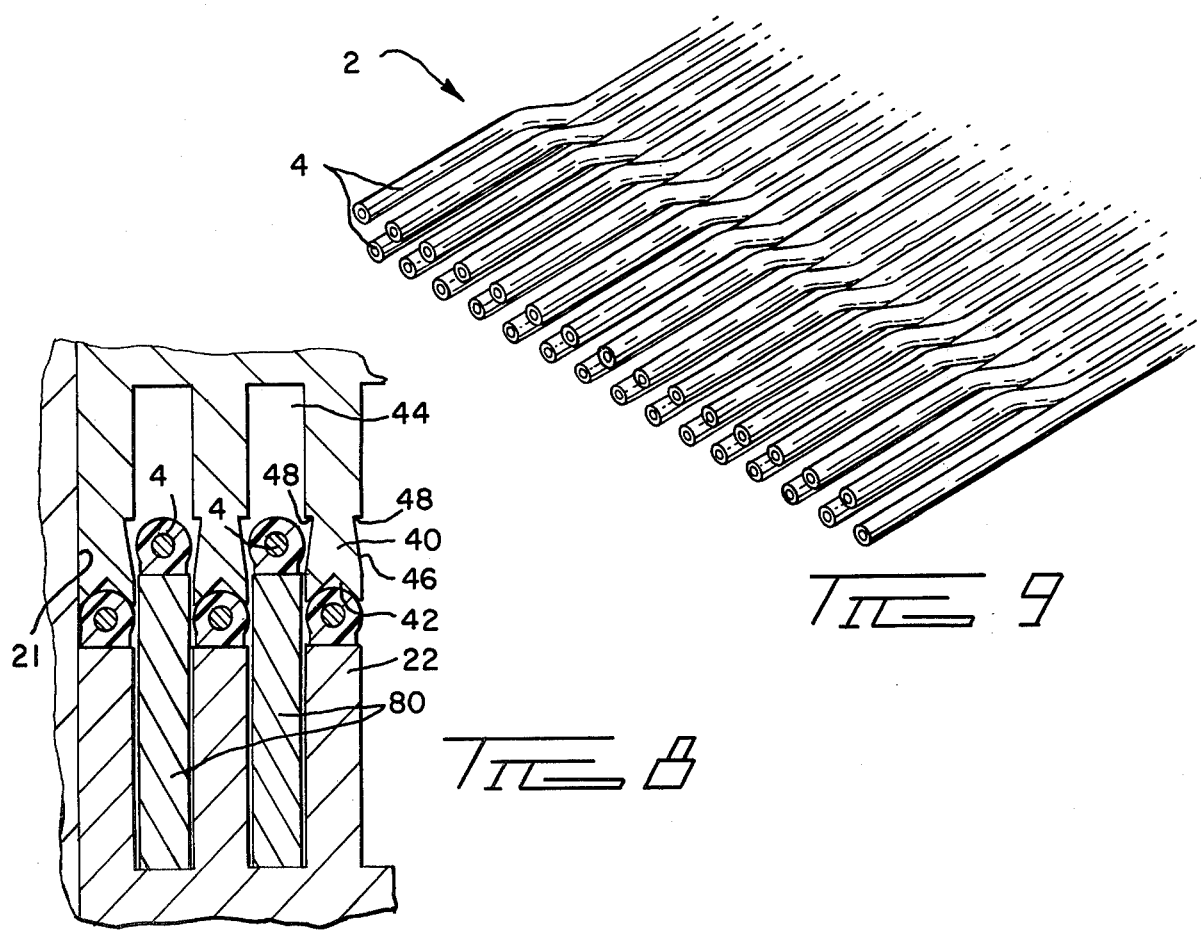

CABLE SPLITTER

BACKGROUND OF THE INVENTION

1. Field of the Invention

The disclosing invention resides broadly in the field of ribbon cable splitting and is particularly adapted for use in splitting telecommunications or data communication-type ribbon cable.

2. Description of the Prior Art

There are a number of prior art devices suitable for splitting ribbon cable. The most common prior art devices employ opposed rollers through which the cable is fed. The rollers, either through calendering means or cutting wheels, separate the conductors within the cable. The problem with prior art devices is frequent conductor insulation damage or misalignment of the conductors within the insulation. These problems are caused by the failure to maintain constant cable control and conductor alignment during cable splitting. The need for controlled separation of the conductors is particularly important in today's high density, close center line mass termination-type insulation displacement connectors. It is, therefore, a purpose of the present invention to remove these prior art infirmities by providing a true to center splitting which results in a product having the proper conductor insulation as well as the proper conductor alignment within the insulation.

SUMMARY OF THE INVENTION

The present invention comprises a compact apparatus for rapidly separating the plurality of conductors within the ribbon cable while maintaining conductor tolerances and insulation integrity. The apparatus has a set of upper and lower clamping jaws which gain control over the ribbon cable in the horizontal and vertical planes and assures alignment of the conductors within the ribbon cable. An operator simply places the ribbon cable between the upper and lower jaws. Upon clamping the jaws together, the conductors are aligned within the clamping means. The series of finger-like splitting blades are then moved into the longitudinal axis of the conductors and split the cable. The splitting is done in such a manner that those conductors which engage the fingers are moved out of the plane of the ribbon cable while the remaining conductors are maintained in the plane of the ribbon cable.

It is an object of this invention to provide a simplified apparatus which may be operated with equal efficiency in a plant or field environment.

It is an object of this invention to provide an apparatus which can be manually or automatically operated.

It is an object of this invention to provide an apparatus which will separate conductors while causing a minimum of damage to both the cable and the insulation surrounding the individual conductors It is an object of this invention to provide an apparatus which may be operated without special training of the technician.

It is an object of this invention to provide an apparatus which may be programmed by simply removing the splitting blades to allow flexibility in the splitting of ribbon cable.

BRIEF DESCRIPTION OF THE DRAWINGS

FIG. 2 is a side elevation of the apparatus with a partial section to highlight the cable capture area.

FIG. 3 is a section taken along the lines 3—3 of FIG. 1.

FIG. 4 is a section taken along the lines 4—4 of FIG. 3.

FIG. 4A is a fragmentary view of the cable capture area.

FIG. 5 is a section taken along the line 5—5 of FIG. 3.

FIG. 6 is a perspective view of the cable capture jaws separated from the apparatus.

FIG. 7 is an instantaneous section which shows the cable splitting and tooth configuration of the apparatus.

FIG. 8 is an alternative embodiment of the cable capture area.

FIG. 9 is a perspective view of a cable split in the apparatus of the preferred embodiment.

DESCRIPTION OF THE PREFERRED EMBODIMENT

Figure 1:
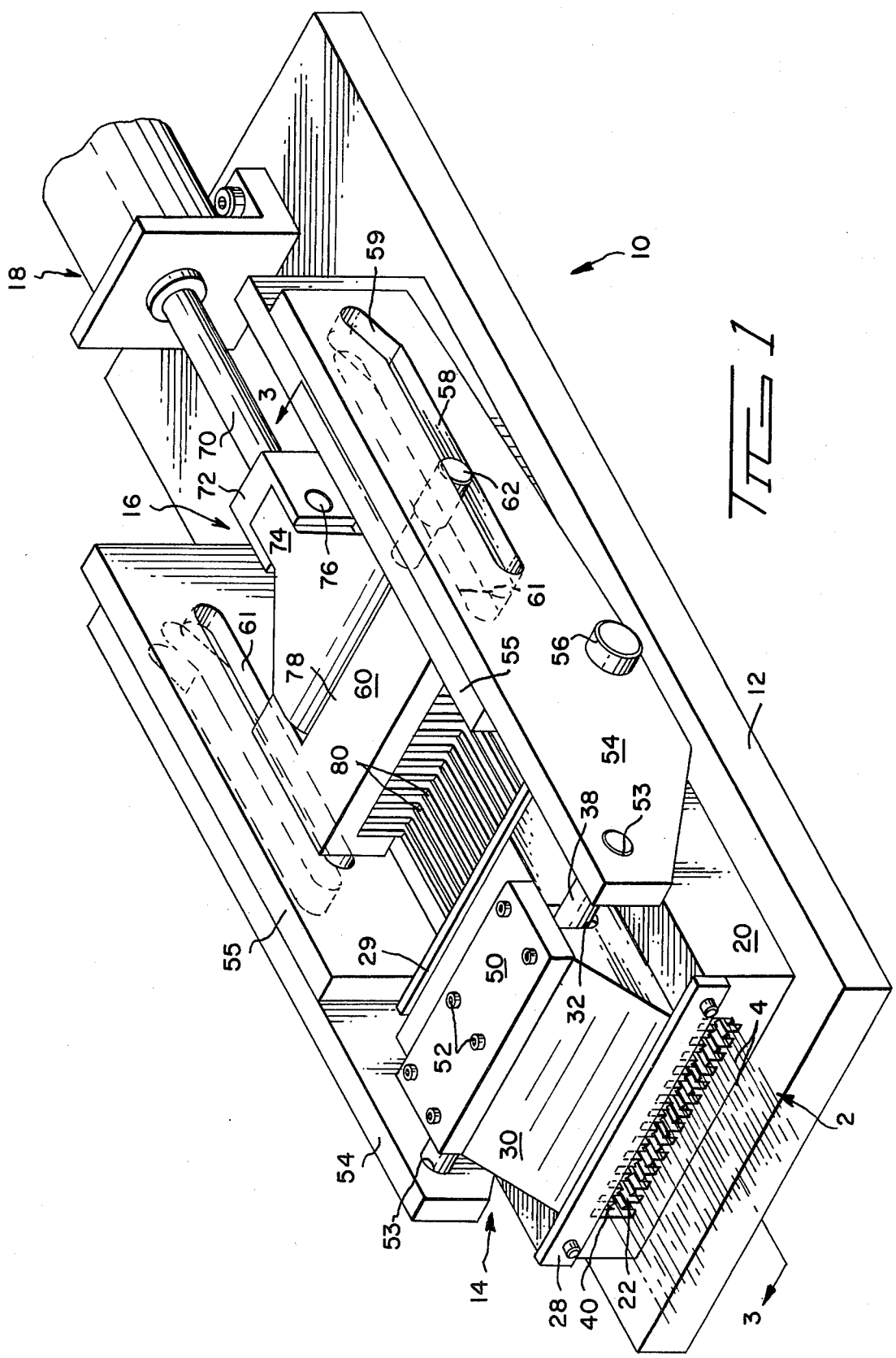
FIG. 1 is a perspective view of an apparatus according to the instant invention.

Referring now, in detail, to the FIGS. 1 through 9, there is shown a preferred embodiment according to the instant invention of an apparatus for splitting ribbon cable. The apparatus shown in these figures is powered by an air cylinder and incorporates a self-closing clamping device.

Referring now to FIG. 1, there is shown the apparatus 10, in a mid-stroked condition, having a cable 2 with a plurality of conductors 4 located in the cable clamping and alignment portion 14. Splitting blade assembly 60 is in a half-forward position and is powered by the said cylinder 18 which is attached to the splitter assembly 16. The apparatus consists generally of a base 12 on which is mounted a cable clamp comprised of a lower jaw 20 and an upper jaw 30, rocker arms 54 are for closing the upper and lower jaws and a cutter assembly 60 is for splitting the cable. The lower jaw 20 has mounted thereon a forward guide 28 and rear guide 29 which guide the upper jaw 30 in a vertical manner as it is moved into and out of a clamping position about the cable 2.

The upper jaw 30 is a solid piece of metal in a preferred embodiment which has been slotted at 32 through the top center portion thereof. Shaft 38 is retained in slot 32 by a retaining plate 50 which is attached by a plurality of suitable fasteners 52. Shaft 38 is received in bore 53 of each rocker arm 54. The upper jaw 30 is moved in and out of contact with cable 2 by means of the rocker arms 54 which are pivotablly pinned via pins 56 to upstanding side plate 55. Side plates 55 are stationarily mounted to base 12. Rocker arms 54 are free to pivot about pins 56 and are caused to move jaw 30 in a vertical manner via cooperating camtrack 58 and shaft 62.

Referring now to FIG. 2, there is shown an apparatus according to the instant invention of the splitter assembly 16 fully retracted Shaft 62 rides in a linear track 61 located in each of the side plates 55. Camtrack 58 and linear track 61 are parallel throughout most of their length until reaching the rearward portion of camtrack 58 which has an upward slanted elbow 59. Thus shaft 62 moves the rearward portion of rocker arm 54 down, causing rocker arms 54 to pivot about pins 56 and lift upper jaw 30 to provide clearance for cable insertion. Note that the lower jaw 20 extends fully rearward to a position substantially under the beginning of the upward slant of track 58. The purpose of this lower jaw will be more fully explained hereinafter.

Referring now to FIG. 3, there is shown in a section taken through the lines 3—3 of FIG. 1, the apparatus again in a half-forward position. The lower jaw 20 is comprised of a plurality of upstanding teeth 22 which define a plurality of blade tracks 26. The upper jaw 30 has a plurality of downward disposed teeth 40 which are on center line with the teeth 22 of lower jaw 20 and a plurality of grooves 44 defined by the teeth 40 which are on center line with the blade tracks 26 of lower jaw 20. The forward guide 28 and the rear guide 29 are clearly shown fastened to lower jaw 20. Thus it can be seen that the guide plates will serve to keep upper jaw 30 moving in a vertical position without regard to the movement of rocker arms 54.

Referring now to FIG. 4, there is shown a section through the lines 4—4 of FIG. 3 which clearly show the cooperation of the upper and lower jaws. Note that each of the teeth 22 has a V-shaped notch 24 which extends for the length of the teeth 22 of lower jaw 20. Teeth 40 of the upper jaw 30 have a similiar notch 42 which cooperates with the notch 24 to surround the conductor 4 of the cable 2 and to cause a pinching of the insulation on either side of the confined conductor. It sould be noted at this point that the side walls 21 of lower jaw 20 define a cavity having a nominal width less than the nominal width of the cable to be inserted therein. This is to assure that the cable located therein will be compressed somewhat and the conductors moved over the respective teeth. This insures that as the conductors are split they are properly aligned and confined along the desired center line spacing. Fragmentary 4A shows the confinement of the cable between the upper and lower jaws in addition to the vertical and horizontal alignment forces which are exerted by the clamping devices of the jaws as they are brought into contact with the cable.

Referring again to FIG. 4, it can be seen that the upper jaw 30 has two spring seats 34 which are designed and dimensioned in the preferred embodiment to accept Belville washer assembly 36. The purpose of the Belville washer assembly 36 is to permit some override when the cable is fully clamped and the shaft 38 is contunued in its downward motion. This compression of the Belville washer assembly assures that the cable and the conductors will not be crushed by the force of clamping.

Referring briefly to FIG. 5, a section through the lines 5—5 of FIG. 3, it is possible to see the splitting sequence. The blades 80 gradually contact the captured conductors as shown in FIGS. 3 and 4 and move selected conductors out of the plane of the cable as shown in FIG. 5. The differential shown in FIG. 5 is sufficient to achieve complete separation.

Referring again to FIG. 3, the section taken through the lines 3—3 of FIG. 1, there is clearly shown the structure of splitter assembly 16. Splitter assembly 16 comprises a drive shaft 70 attached to a drive means 18, yoke 72 attached to pawl 74 by way of wrist pin 76 and splitter blade assembly 60. Pawl 74 is attached to a splitter blade assembly 60 via shaft 62. Splitter blade assembly comprises a frame member 78 which has been hollowed to accept a plurality of L-Shaped blades 80. Blades 80 are positioned within the tracks 26 of lower jaw 20. The plurality of blades are attached to frame 78 via pin 82 which extends for the entire width of frame 78 and through each of the respected blades. Note that the blades 80 are loosely confined within the frame 78 and are positioned via the track 26. The blades 80 will slide in track 26 with a forward and rearward motion to achieve splitting of the cable. Track 26 has been opened at the far end thereof, which permits the fall away or removal of waste material which may gather in the blade tracks. The blades 80 are confined as to sideways movement by the teeth 22 and as to vertical movement at one end thereof by frame member 78 and at the end of 86 thereof by rear guide 29. Note that the blades 80 have a taper 88 which is designed to permit a gradual contact with the conductor confined by the clamping of the jaws 20 and 30 and to avoid conductor damage on entry of the blades 80 into the splitting area.

Turning now to FIG. 6, there is shown the lower jaw 20 and upper jaw 30 removed from the apparatus 10. Note that the upper jaw 30 is dimensioned to be received within the cavity defined by walls 21. It can be clearly seen that the teeth 22 of lower jaw 20 extend rearward beyond the cable clamping area of jaws 20 and 30. The resulting tracks provide guidance and stability for the respective splitting blades. Note also that the far end of the blades are open, as previously mentioned, to permit removal of waste materials.

FIG. 7 is a fragmentary section of the opposed teeth 22 and 40. As previously stated, the opposed teeth have opposed notches 24 and 42 for conductor centering and insulation gripping. In addition, it is possible to see the configuration of teeth 40 more clearly. Teeth 40 have a tapered surface 46 which extends from the external edges of notches 42 to the ridges 48. Ridges 48 are of a height at least equal to the height of the splitting blade 80 plus the conductor diameter. The relief formed by taper 46 and ridges 48, while not essential, permit easy withdrawl of the conductor and cables after splitting.

FIG. 8 is a fragmentary section of the opposed teeth 22 and 40 and show an alternative embodiment of teeth 22 which has been found to have advantage on splitting cable having a flat surface.

OPERATION

It can be seen that in operation, the drive shaft 70 will move splitter assembly 16 in a forward direction, thereby causing the rocker arms 54 to capture a ribbon cable between jaws 20 and 30. This capture is achieved by movement of shaft 62 down the elbow 59 and along camtrack 58. As the camtrack 58 is brought into a parallel relationship with the track 61 of side plates 55, it can be seen that the jaw 30 is moved downward. After capture has been achieved, the continued forward movement of the drive shaft 70 will move the splitter assembly into contact with the conductors. Those conductors which were disposed directly over the splitting blades will be pushed out of the plane of the cable, as shown in FIG. 3, effectively shearing the individual conductors from the cable for the length of contact with blades 80.

What is claimed is:

1. An apparatus for separating selected conductors from the plurality of conductors confined in a ribbon cable, comprising a cable clamp having upper and lower jaws, said jaws having a plurality of opposed teeth defining a plurality of opposed voids for clamping selected conductors among said plurality of said conductors between said teeth, a plurality of splitting blades dimensioned to be received in said voids and having a mean height greater than that of said teeth of said lower jaw, and drive means for moving said splitting blades along said voids and separating selected conductors.

2. An apparatus for separating selected conductors from the plurality of conductors confined in a ribbon cable, comprising:
- a cable clamp having upper and lower jaws, said lower jaw having side walls which define a cable receiving cavity having a nominal width less than the nominal width of said cable and a plurality of teeth which define a plurality of voids, said upper jaw having a width receivable between said side walls and a plurality of second teeth which oppose said teeth and define a pluality of second voids which oppose said voids, for clamping selected conductors among said plurality of said conductors between said opposed teeth,
- a plurality of splitting blades dimensioned to be received in said voids and having a mean height greater than that of said teeth of said lower jaw, and
- drive means for moving said splitting blade along said voids and separating selected conductors.

3. The apparatus of claim 2 wherein said lower jaw extends rearward beyond said upper jaw and said teeth and said voids form tracks for receiving said splitting blades.

4. An apparatus for separating selected conductors among the plurality of conductors in a ribbon cable comprising:
- a base
- a lower jaw mounted on said base, said lower jaw having a forward portion and a rearward portion, said forward portion having side walls which define a cable receiving cavity having a nominal width less than the nominal width of said cable and a plurality of teeth which define a plurality of voids, said plurality of teeth and said plurality of voids extending throughout said rearward portion,
- an upper jaw having a width receivable within said side walls, said upper jaw having a plurality of second teeth and second voids which are opposite said teeth and voids of said lower jaw,
- side plates mounted on said base on either side of said rearward portion of said lower jaw,
- rocker arms pivotablly mounted on said side plates, said rocker arms having a forward portion which extends parallel to said upper jaw and a shaft which extends between said rocker arms,
- biasing means for pivoting said rocker arms to bring said shaft into contact with said upper jaw and move said upper jaw toward said lower jaw,
- a plurality of splitting blades dimensioned to be received in said voids and having a mean height greater than that of said teeth of said lower jaw, and
- drive means for moving said splitting blades along said voids.

* * * * *